(12) United States Patent
Niikura

(10) Patent No.: US 10,380,706 B2
(45) Date of Patent: Aug. 13, 2019

(54) EQUIPMENT MANAGEMENT APPARATUS

(71) Applicant: DAIKIN INDUSTRIES, LTD., Osaka-shi, Osaka (JP)

(72) Inventor: Nanae Niikura, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 227 days.

(21) Appl. No.: 15/500,003

(22) PCT Filed: Jul. 28, 2015

(86) PCT No.: PCT/JP2015/071395
§ 371 (c)(1),
(2) Date: Jan. 27, 2017

(87) PCT Pub. No.: WO2016/017647
PCT Pub. Date: Feb. 4, 2016

(65) Prior Publication Data
US 2017/0262945 A1  Sep. 14, 2017

(30) Foreign Application Priority Data

Jul. 31, 2014 (JP) ................................ 2014-156194

(51) Int. Cl.
*G06F 19/00* (2018.01)
*G06Q 50/06* (2012.01)
(Continued)

(52) U.S. Cl.
CPC ........... *G06Q 50/06* (2013.01); *G05B 13/026* (2013.01); *G06Q 40/04* (2013.01); *H02J 13/00* (2013.01)

(58) Field of Classification Search
CPC ...... G05B 13/026; G06Q 40/04; G06Q 50/06; H02J 13/00
See application file for complete search history.

(56) References Cited

U.S. PATENT DOCUMENTS 6,785,592 B1   8/2004 Smith et al.
9,057,746 B1 *  6/2015 Houlette ............... G06Q 50/06
(Continued)

FOREIGN PATENT DOCUMENTS

JP   2000-92705 A    3/2000
JP   2008-77345 A    4/2008
(Continued)

OTHER PUBLICATIONS

International Search Report of corresponding PCT Application No. PCT/JP2015/071395 dated Nov. 2, 2015.
(Continued)

*Primary Examiner* — Kidest Bahta
(74) *Attorney, Agent, or Firm* — Global IP Counselors, LLP

(57) ABSTRACT

An equipment management apparatus manages at least one equipment unit that is supplied with energy and that consumes energy. The equipment management apparatus includes a result value storage unit, an adjustment control implementation status storage unit, and a hypothetical value computation unit. The result value storage unit stores result values of an amount of energy consumed in a first particular day by the at least one equipment unit. The result values are stored in association with time slots of the first particular day. The adjustment control implementation status storage unit stores adjustment control implementation status information indicating whether or not energy adjustment control has been performed in each of the time slots of the first particular day. The hypothetical value computation unit computes a hypothetical value of an amount of energy consumed by the at least one equipment unit as if the energy adjustment control had not been performed.

19 Claims, 8 Drawing Sheets

(51) Int. Cl.
*H02J 13/00* (2006.01)
*G05B 13/02* (2006.01)
*G06Q 40/04* (2012.01)

(56) References Cited

U.S. PATENT DOCUMENTS

| | | | |
|---|---|---|---|
| 9,172,245 B1 * | 10/2015 | Lentine | H02J 3/00 |
| 9,285,783 B2 * | 3/2016 | Craig | G05B 13/02 |
| 2008/0082350 A1 | 4/2008 | Ainsworth et al. | |
| 2008/0270078 A1 | 10/2008 | Fluegge et al. | |
| 2010/0250440 A1 * | 9/2010 | Wang | G06Q 10/06 |
| | | | 705/63 |
| 2013/0214763 A1 * | 8/2013 | Kubota | H02J 3/14 |
| | | | 324/113 |
| 2015/0019023 A1 | 1/2015 | Kotake et al. | |
| 2015/0220098 A1 | 8/2015 | Hashimoto et al. | |

FOREIGN PATENT DOCUMENTS

| | | |
|---|---|---|
| JP | 2013-38958 A | 2/2013 |
| JP | 2013-118727 A | 6/2013 |
| JP | 2013-176276 A | 9/2013 |
| JP | 2013-230051 A | 11/2013 |
| JP | 2014-21555 A | 2/2014 |
| WO | 2014050735 A1 | 4/2014 |

OTHER PUBLICATIONS

International Preliminary Report of corresponding PCT Application No. PCT/JP2015/071395 dated Jul. 28, 2015.
European Search Report of corresponding EP Application No. 15 82 6423.4 dated Nov. 14, 2017.

\* cited by examiner

FIG. 7(a)

| TIME | PAST RESULT VALUES | | | | CURRENT DAY |
|---|---|---|---|---|---|
| | 4 DAYS PRIOR | 3 DAYS PRIOR | 2 DAYS PRIOR | 1 DAYS PRIOR | |
| ⋮ | ⋮ | ⋮ | ⋮ | ⋮ | ⋮ |
| 12:45 —13:00 | WITHOUT DR | WITHOUT DR | WITHOUT DR | WITHOUT DR | USE AS REFERENCE |
| 13:00 —13:15 | WITHOUT DR | WITH DR ↓ COMPLEMENT | WITH DR ↓ COMPLEMENT | WITH DR ↓ COMPLEMENT | USE AS REFERENCE |
| ⋮ | ⋮ | ⋮ | ⋮ | ⋮ | ⋮ |

FIG. 7(b)

| TIME | PAST RESULT VALUES | | | | CURRENT DAY |
|---|---|---|---|---|---|
| | 4 DAYS PRIOR | 3 DAYS PRIOR | 2 DAYS PRIOR | 1 DAYS PRIOR | |
| ⋮ | ⋮ | ⋮ | ⋮ | ⋮ | ⋮ |
| 12:45 —13:00 | WITHOUT DR | WITHOUT DR | WITHOUT DR | WITHOUT DR | USE AS REFERENCE |
| 13:00 —13:15 | WITHOUT DR | WITH DR | WITH DR | WITH DR | USE AS REFERENCE |
| ⋮ | ⋮ | ⋮ | ⋮ | ⋮ | ⋮ |

EQUIPMENT MANAGEMENT APPARATUS

CROSS-REFERENCE TO RELATED APPLICATIONS

This U.S. National stage application claims priority under 35 U.S.C. § 119(a) to Japanese Patent Application No. 2014-156194, filed in Japan on Jul. 31, 2014, the entire contents of which are hereby incorporated herein by reference.

TECHNICAL FIELD

The present invention relates to an equipment management apparatus, and particularly relates to a equipment management apparatus for managing at least one equipment unit that is supplied with electric energy or another type of energy and that consume energy.

BACKGROUND ART

Recently, in countries and regions all over the world, electric power supply systems are being converted from "vertical integration" models to "structural separation" models in which the electricity generation, electricity transmission, electricity distribution, and retailing tasks are allocated, and there is a tendency to progress an electricity market liberalization. In the "structural separation" electric power supply system, a "transmission system operator" required to stably supply electric power needs to, in order to adjust (i.e., balance) supply and demand in the system, ensure that there is reserve power in a power supply capacity in preparation for changes in the amount of short-term power consumption, accidents at the power station, drops in the generation of renewable energy, and other such cases. To achieve this, a balancing market (a power transaction market that starts prior to the actual supply and demand) is established by the "transmission system operator," and not only a monetary value relating to the amount of energy when energy consumption is actually reduced for the sake of balancing, but a monetary value relating to the energy control capacity (reserve power) by which reductions are controlled in accordance with requests from the "transmission system operator" are created.

For example, as is stated in Japanese Laid-open Patent Publication No. 2013-230051, power consumption in the case of no power reduction (baseline), which is referred to in Patent Literature 1 as a negawatt reference value, needs to be properly estimated in order to pay out a value for reduced power or reserve power.

SUMMARY

Technical Problem

In cases where past result values are used for the baseline as is stated in Japanese Laid-open Patent Publication No. 2013-230051, the baseline cannot be regarded as proper when the past result values have been affected by demand response control. Therefore, the baseline could be calculated after removing the result values that occurred under demand response control, but it is difficult to ensure the result values of the numbers needed as parameters during seasons when demand response control is frequent. Moreover, when searching through past values until the necessary parameters are found, there may be the possibility of going so far back that the parameters are greatly affected by seasonal changes.

In cases where an equipment unit is an air conditioning apparatus or another device affected by climatic changes, and it was possible to ensure result values for calculating baseline by going so far back that the parameters are greatly affected by seasonal changes, the projected baseline may be greatly affected by climatic changes, and adequacy of the results is inevitably doubtful.

In view of this, an object of the present invention is to provide an equipment management apparatus that can be used in the energy transaction market, and that yields a highly reliable baseline.

Solution to Problem

An equipment management apparatus according to a first aspect of the present invention is an equipment management apparatus configured to manage at least one equipment unit that is supplied with energy and that consumes energy, the equipment management apparatus comprising: a result value storage unit configured to store result values of an amount of energy consumed in a first particular day by the at least one equipment unit, the result values being stored in association with time slots of the first particular day, an adjustment control implementation status storage unit configured to store adjustment control implementation status information indicating whether or not energy adjustment control, which is based on information pertaining to a request of the energy adjustment control and/or information pertaining to energy prices for the at least one equipment unit, has been performed in each of the time slots of the first particular day; and a hypothetical value computation unit configured to compute a hypothetical value of an amount of energy consumed by the at least one equipment unit as if the energy adjustment control had not been performed. The hypothetical value computation unit use information pertaining to the result values of the first particular day, for either a time slot during which the energy adjustment control as specified by the adjustment control implementation status information stored in the adjustment control implementation status storage unit has been performed, or an adjustment control effect period determined from this time slot, during which period consideration should be given to the effect of the energy adjustment control.

In the equipment management apparatus according to the first aspect, because a hypothetical value of the amount of energy consumed by the equipment unit is computed by the hypothetical value computation unit using the result values of the first particular day, the situation of the first particular day is more easily reflected in the hypothetical value of the first particular day, which is the same day, than when a result value of another day besides the first particular day is used.

An equipment management apparatus according to a second aspect of the present invention is the equipment management apparatus according to the first aspect, further comprising a baseline deciding unit configured to determine a baseline of a second particular day as if the energy adjustment control had not been performed. The baseline deciding unit uses the result values of the at least one equipment unit stored in the result value storage unit and the hypothetical value of the at least one equipment unit computed by the hypothetical value computation unit.

In the equipment management apparatus according to the second aspect, a highly reliable baseline decision is made possible because the baseline is decided by the baseline deciding unit using a highly reliable hypothetical value computed by the hypothetical value computation unit.

An equipment management apparatus according to a third aspect of the present invention is the equipment management apparatus according to the second aspect, wherein the at least one equipment unit includes a first equipment unit, and in order to decide the baseline of the second particular day, the baseline deciding unit uses data of the first particular day including a hypothetical value of the first equipment unit for a time slot in which the energy adjustment control was performed and a result value of the first equipment unit was used for a time slot in which the energy adjustment control was not performed.

In the equipment management apparatus according to the third aspect, because a hypothetical value is not used for a time slot in which the energy adjustment control was not performed in data of the first particular day used by the baseline deciding unit in order to decide a baseline, errors can be reduced when the equipment management apparatus is applied to a case in which the result value would not likely be affected by the energy adjustment control.

An equipment management apparatus according to a fourth aspect of the present invention is the equipment management apparatus according to the second or third aspect, wherein the at least one equipment unit includes a second equipment unit, and in order to decide the baseline of the second particular day, the baseline deciding unit uses a hypothetical value of the second equipment unit for a time slot in which the energy adjustment control was performed and also a time slot of a recovery period continuing from this time slot, and uses data of the first particular day for which the result value of the second equipment unit was used for a time slot in which the energy adjustment control was not performed, excluding the recovery period.

In the equipment management apparatus according to the fourth aspect, because a hypothetical value is used even during the recovery period of the time slot in which the energy adjustment control was not performed in the data of the first particular day used by the baseline deciding unit in order to decide a baseline, errors can be reduced when the equipment management apparatus is applied to a case in which the result value would be affected by the energy adjustment control and would fluctuate during the recovery period.

An equipment management apparatus according to a fifth aspect of the present invention is the equipment management apparatus according to any of the first through fourth aspects, wherein the hypothetical value computation unit performs, as a hypothetical value computation using information pertaining to the result values of the first particular day, complementation using the result value of a time slot preceding a time slot during which the energy adjustment control was performed.

In the equipment management apparatus according to the fifth aspect, the hypothetical value of a time slot during which the energy adjustment control was performed in the first particular day is complemented by the result values of the first particular day before the energy adjustment control was performed, whereby a hypothetical value for the first particular day can be computed in a short time after the energy adjustment control through a simple process of complementation performed by the hypothetical value computation unit.

An equipment management apparatus according to a sixth aspect of the present invention is the equipment management apparatus according to any of the first through fifth aspects, wherein the hypothetical value computation unit performs, as a hypothetical value computation using information pertaining to the result values of the first particular day, complementation using the result value of a time slot following a time slot during which the energy adjustment control was performed.

In the equipment management apparatus according to the sixth aspect, the hypothetical value of a time slot during which the energy adjustment control was performed in the first particular day is complemented by the result values of the first particular day after the energy adjustment control was performed, whereby a hypothetical value for the first particular day can be computed in a short time after the energy adjustment control through a simple process of complementation performed by the hypothetical value computation unit.

An equipment management apparatus according to a seventh aspect of the present invention is the equipment management apparatus according to any of the first through sixth aspects, wherein the hypothetical value computation unit computes a hypothetical value by inputting a parameter of the first particular day into a regression formula prepared in advance.

In the equipment management apparatus according to the seventh aspect, due to a parameter of the first particular day being inputted into a regression formula, operating conditions and/or environment conditions of the installed devices from the first particular day can be reflected in the hypothetical value by the parameter, and errors in the hypothetical value computation, which occur due to changes in the operating conditions and/or environment conditions, can be reduced.

An equipment management apparatus according to an eighth aspect of the present invention is the equipment management apparatus according to any of the first through seventh aspects, wherein the hypothetical value computation unit performs, as a hypothetical value computation using information pertaining to the result values of the first particular day, an extraction in which a parameter of the first particular day is inputted and a past result value having a parameter similar to the parameter of the first particular day is extracted as a hypothetical value.

In the equipment management apparatus according to the eighth aspect, due to a past result value having a parameter similar to the parameter of the first particular day being extracted as a hypothetical value, operating conditions and/or environment conditions of the equipment unit from the first particular day can be reflected in the hypothetical value by the parameter, and in cases such as when, for example, peculiar circumstances arise in the energy consumption of the equipment unit in the first particular day, errors in computation can be reduced by extracting a past result value different from that of the first particular day as a hypothetical value.

Advantageous Effects of Invention

With the equipment management apparatus according to the first aspect of the present invention, factors such as changes in the environment, which differ depending on the day, are not likely to have an effect, and the reliability of the hypothetical value of the amount of energy consumed by the equipment units can be improved. For example, a highly reliable baseline can be provided when this type of hypothetical value is used to project the baseline.

With the equipment management apparatus according to the second aspect of the present invention, it is possible to obtain a highly reliable baseline that can be used in the energy transaction market.

With the equipment management apparatus according to the third aspect of the present invention, when, for example, the equipment management apparatus is applied to a case in which a result value would not likely be affected by the energy adjustment control, the reliability of the baseline can be improved.

With the equipment management apparatus according to the fourth aspect of the present invention, when, for example, the equipment management apparatus is applied to a case in which a result value would be affected by the energy adjustment control and would fluctuate within the recovery period, the reliability of the baseline can be improved.

With the equipment management apparatus according to the fifth aspect of the present invention, hypothetical values that are not affected by the energy adjustment control can be obtained in a simple manner without referring back to past days.

With the equipment management apparatus according to the sixth aspect of the present invention, hypothetical values that are not affected by the energy adjustment control can be obtained in a simple manner without referring back to past days.

With the equipment management apparatus according to the seventh aspect of the present invention, the reliability of hypothetical values is improved.

With the equipment management apparatus according to the eighth aspect of the present invention, because a past result value different from that of the first particular day can also be used, the increase in errors in the hypothetical value computation can be reduced when, for example, the result value of the first particular day is peculiar, and the reliability of hypothetical values can be improved.

BRIEF DESCRIPTION OF THE DRAWINGS

FIG. 7(a) is a chart for illustrating a method of calculating baseline according to one embodiment, and (b) is a chart for illustrating a prior art method of calculating baseline.

DESCRIPTION OF EMBODIMENTS (1) Description of Baseline

An adjustment amount, regarded as the result of energy adjustment control, is defined as the amount obtained by subtracting the actual consumed energy amount from a baseline. The baseline used in this definition is the energy amount that the energy consumer either has actually consumed or is supposed to have consumed when the energy adjustment control is not performed. The energy adjustment control is, e.g., demand response control.

The energy adjustment control is performed on the basis of a request for the energy adjustment control from the supplier of the energy adjustment control, and/or information pertaining to energy prices. The energy adjustment control is performed on an equipment unit operated by an energy consumer. The transfer of information pertaining to the request for the energy adjustment control is observed between an operator and a consumer who have implemented a contract of, e.g., a demand response contract system in which rewards and penalties are given to the consumer complying with requests from the supplier who is supplying power. The transfer of information pertaining to energy prices is observed between an operator and a consumer who have implemented a contract of, e.g., a time-of-use rate system in which fees specific to time slots are set.

Figure 1:
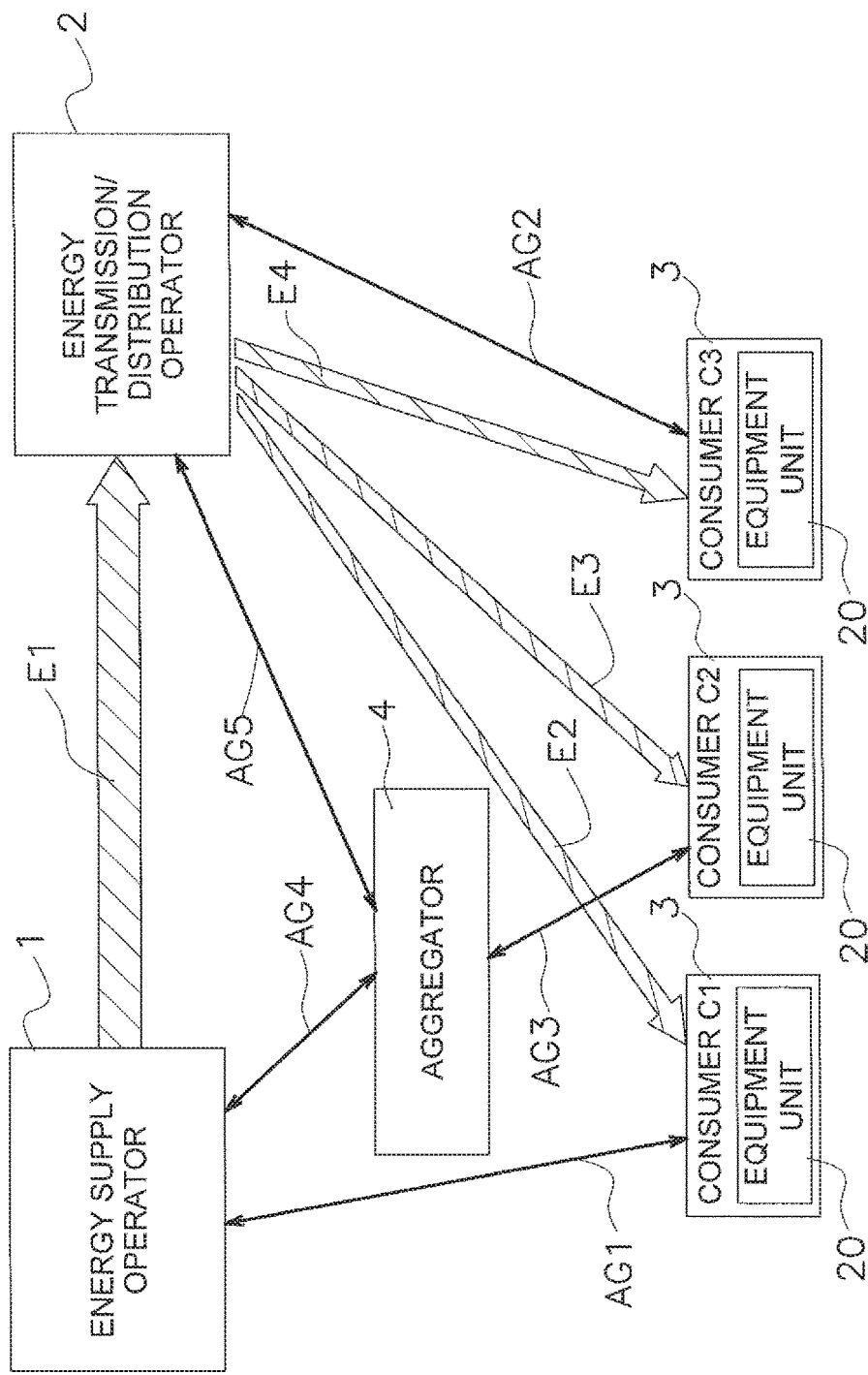
FIG. 1 is a conceptual diagram for illustrating the relationship between an energy supply operator, an energy transmission/distribution operator, an aggregator, and consumers.

Generally, energy is sent from an energy supply operator 1 to facilities 3 of an energy consumer C1, a consumer C2, and a consumer C3, via an energy transmission/distribution operator 2, as shown in FIG. 1. The flow of energy from the energy supply operator 1 to the energy transmission/distribution operator 2 is represented by the arrow E1, and the flow of energy from the energy transmission/distribution operator 2 to the consumer C1, the consumer C2, and the consumer C3 is represented respectively by the arrows E2, E3, and E4. Equipment units 20 which consume the energy are equipped in the respective facilities 3 of the consumer C1, the consumer C2, and the consumer C3. The energy supply operator 1 is, e.g., a power generation operator, and the energy transmission/distribution operator 2 is, e.g., an electricity transmission system operator.

Figure 2:
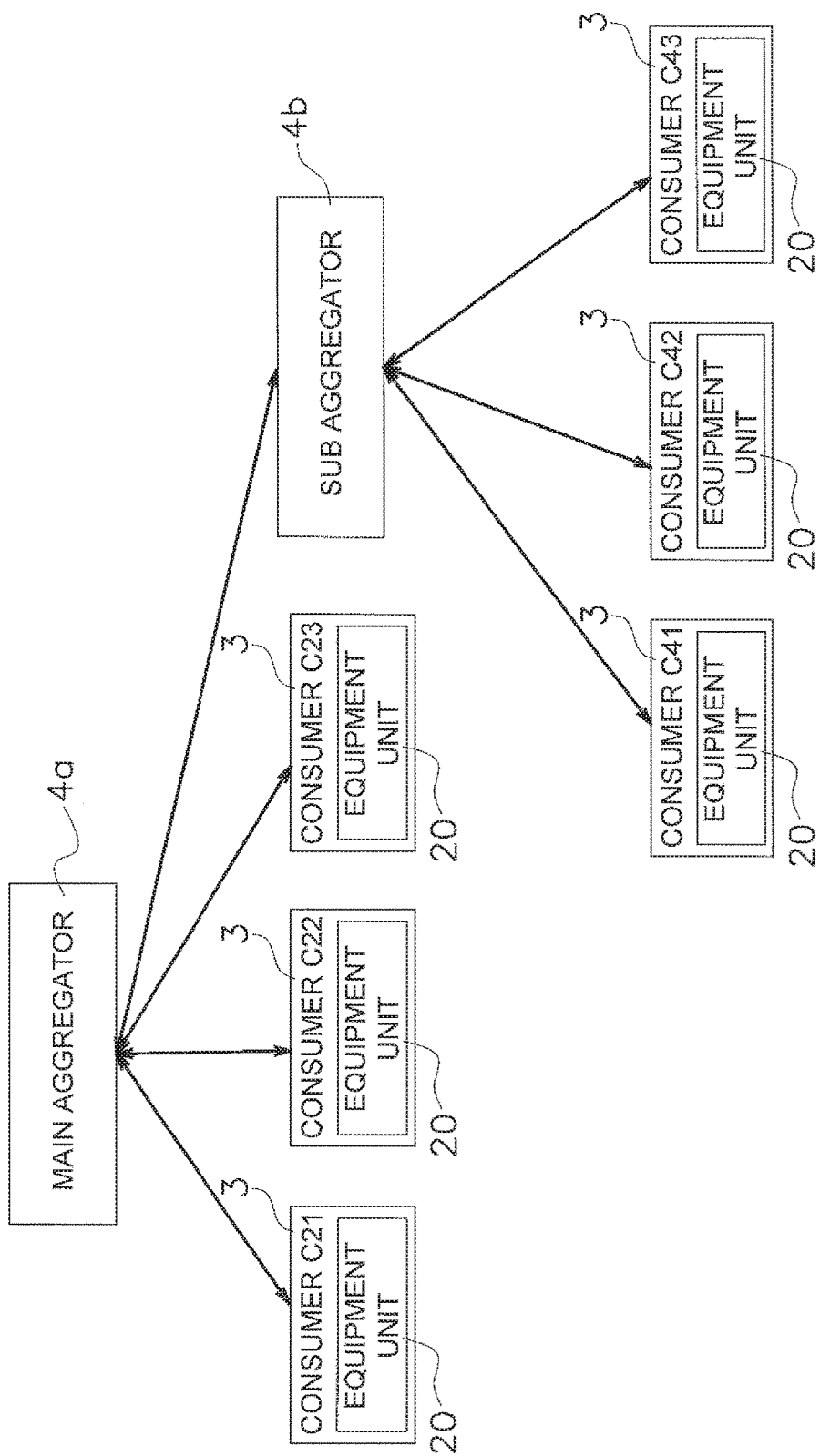
FIG. 2 is a conceptual diagram for illustrating the relationship between aggregators and consumers.

The energy adjustment control contracts include, e.g., those such as a contract AG1 implemented directly between the consumer C1 and the energy supply operator 1 and/or a contract AG2 implemented directly between the consumer C3 and the energy transmission/distribution operator 2, but also sometimes include a contract implemented indirectly with the energy supply operator 1 and/or the energy transmission/distribution operator 2 through an aggregator 4, such as is the case with the consumer C2, as shown in FIG. 1. The contracts AG3, AG4, and AG5 represent contractual relationships that can be implemented among the consumer C2, the aggregator 4, the energy supply operator 1, and the energy transmission/distribution operator 2. There could be one or more each of the energy supply operator 1, the energy transmission/distribution operator 2, and the aggregator 4 shown in FIG. 1. There could also be multiple aggregators 4 involved in a hierarchical manner as is the case with the main aggregator 4a and the sub aggregator 4b as shown in FIG. 2. A consumer C21, a consumer C22, and a consumer C23 directly make a contract for energy adjustment control with the main aggregator 4a, similar to the consumer C2 in FIG. 1, but a consumer C41, a consumer C42, and a consumer C43 make a contract for energy adjustment control with the main aggregator 4a via the sub aggregator 4b.

Figure 3:
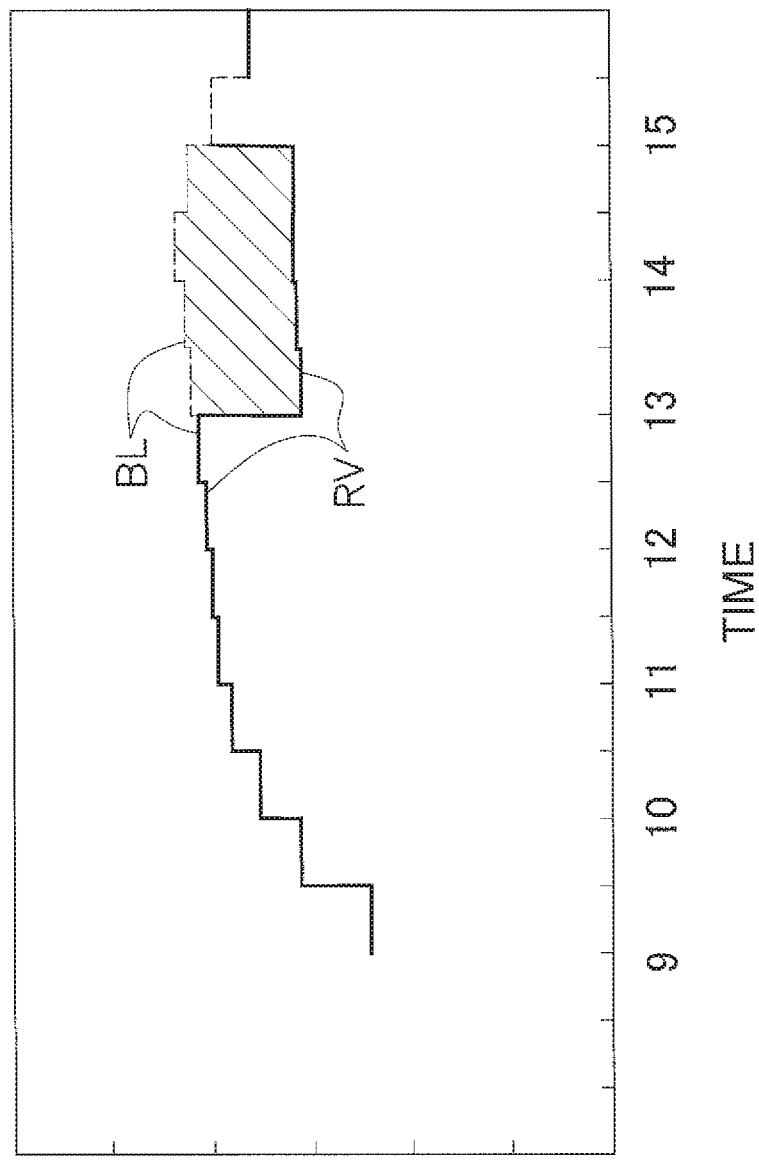
FIG. 3 is a graph for illustrating the relationship between baselines and result values.

FIG. 3 shows an example of a baseline BL and a result value RV for the consumer C2 on a certain particular day. In the example of FIG. 3, the baseline BL and the result value RV coincide until 13:00. In other words, before 13:00, the consumer C had not performed energy adjustment control, and the baseline BL and the result value RV therefore coincided for the most part. In the example of FIG. 3, the consumer C2 performs energy adjustment control in the section from 13:00 to 15:00. As a result, in the section from 13:00 to 15:00, the result value RV falls below the baseline BL. At 15:00, the consumer C2 stops energy adjustment control, and the result value RV therefore again coincides with the baseline BL for the most part from 15:00 onward.

In the example of FIG. 3, because energy adjustment control is performed from 13:00 to 15:00, the area of the section shown in diagonal lines in FIG. 3 is the amount of energy consumed adjusted by the consumer C2 (energy consumption value×time), i.e., the adjustment amount for the consumer C2 on the particular day. The section of the baseline BL shown by the dashed line. i.e., the value of the section from 13:00 to 15:00 is the projected value. Normally, the method of calculating this projected value and the reward received by the consumer C2 on the basis of this adjustment amount are settled on the basis of the contract AG3 between the consumer C2 and the aggregator 4. Therefore, if a large projected value is calculated for the baseline BL in FIG. 3, it is advantageous for the consumer C2 in that the consumer C2 will receive many rewards because a large adjustment amount is estimated, but it is disadvantageous for the aggregator 4 who needs to make a greater payout. Conversely, if a small projected value is calculated for the baseline BL in FIG. 3, it is advantageous for the aggregator 4 who needs to make a smaller payout because a small adjustment amount is estimated, but the reward for the consumer C2 is lessened, which is disadvantageous for the consumer C2. Thus, the baseline BL projection is important for the enterprise of the aggregator 4. This type of calculation for the baseline BL needs to be accurate, simple, and straightforward.

This type of projection of the baseline BL is sometimes made on the basis of, e.g., the contract AG1 between the energy supply operator 1 and the energy user C1 in FIG. 1, and is sometimes made on the basis of the contract AG2 between the energy transmission/distribution operator 2 and the consumer C3. In other words, the method of calculating the projected value of the baseline BL, described hereinafter, and/or the equipment management apparatus incorporating such a calculation method, can be applied in order to carry out the various contracts AG1 to AG5 shown in FIG. 1.

In a case such as that shown in FIG. 1, the time slot of energy adjustment control is derived in accordance with a request of at least one operator among the aggregator 4, the energy supply operator 1, and the energy transmission/distribution operator 2. In FIG. 1, the consumer C1 has contracted only with the energy supply operator 1, but depending on the specifics, the consumer C1 could, e.g., implement an energy-rate-based contract (such as, e.g., a contract of a time-of-use rate system) with the energy supply operator 1, or the consumer C1 could implement an incentive-based contract (such as, e.g., a contract of a demand response contract system) with the aggregator 4. In such cases, there could be cases in which. e.g., the consumer C1 performs energy adjustment control after being notified in real time of a change in the energy rate in accordance with the supply-demand balance, and there could also be cases in which the consumer C1 performs energy adjustment control after being requested to perform energy adjustment control by the aggregator 4. In either of these cases, energy adjustment control causes the result value RV to deviate from what had been the baseline BL when energy adjustment control was not performed. Therefore, in the present embodiment, when a projection of the baseline BL on another particular day is made on the basis of the energy consumption value of the particular day, the energy consumption value for the time slot during which energy adjustment control was performed in the particular day is complemented using a hypothetical value, as is described hereinafter.

(2) Overall Configuration of Energy Management System

Figure 4:
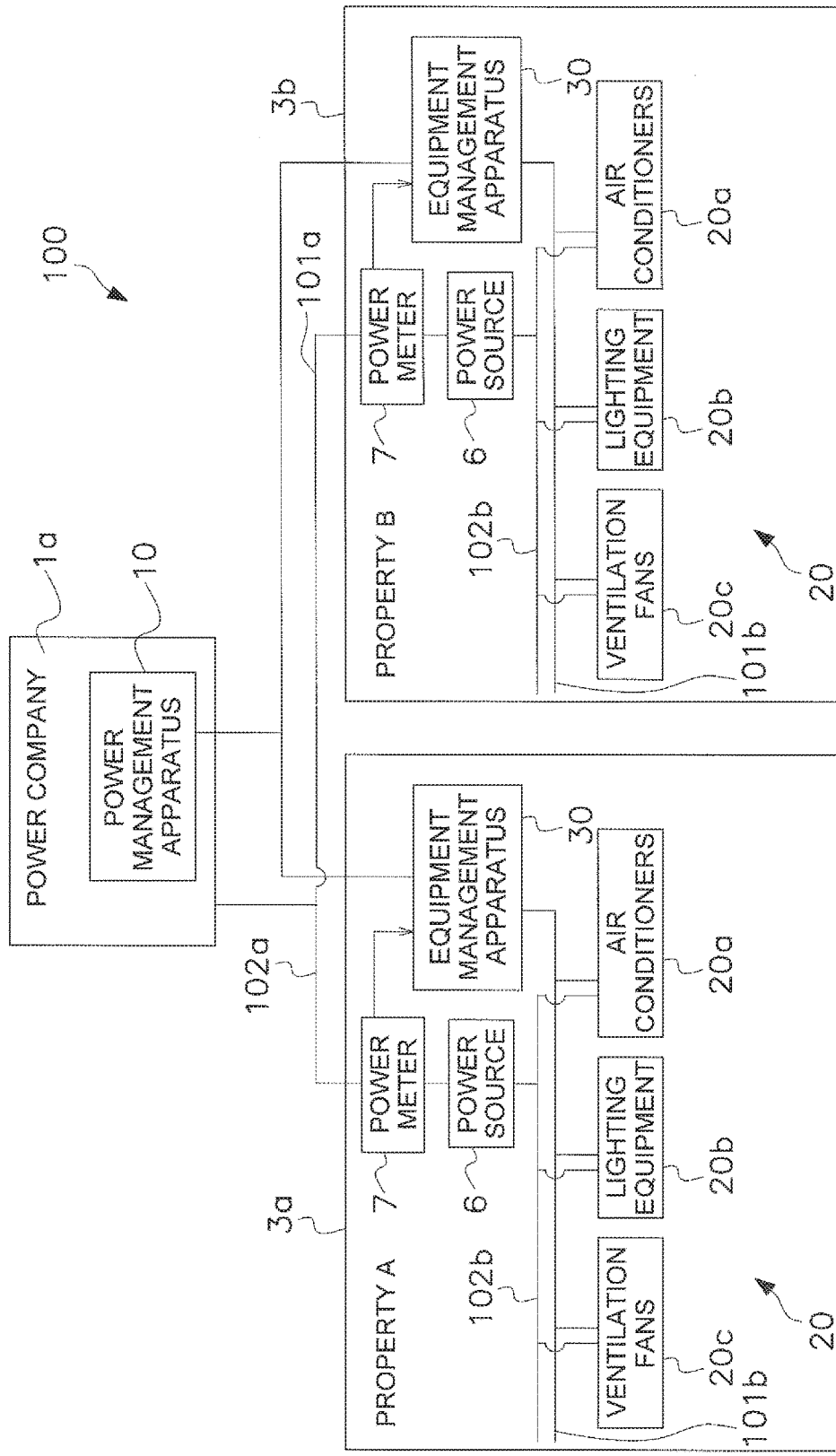
FIG. 4 is a block diagram showing an example of the overall configuration of an energy management system.

To make the description easy to understand below, the energy consumed by an equipment management apparatus according to an embodiment of the present invention is described as being electrical energy. FIG. 4 shows an energy management system according to an embodiment of the present invention. In the energy management system 100 of FIG. 4, power is supplied from a power company 1a to the facility 3a of a property A and the facility 3b of a property B. The facilities 3a, 3b of the properties A, B are, e.g., office buildings, tenant buildings, factories, common households, or other buildings in which at least one equipment unit is equipped. The properties A, B are the subjects of contracts having the same specifics pertaining to demand response control. In FIG. 3, there are only two properties A, B and two facilities 3a, 3b shown as properties to which the power company supplies power, but the number of properties and the number of facilities are not limited to two; there may be one, three, or more.

The power company 1a has a power management apparatus 10. The property A has equipment units 20, a power source 6 for supplying power to the equipment units 20, a power meter 7 for measuring the amount of power supplied from the power source 6 to the equipment units 20, and an equipment management apparatus 30 for controlling the equipment units 20. There are multiple types of equipment units 20 in FIG. 3, including air conditioners 20a, lighting equipment 20b, and ventilation fans 20c.

Power is supplied from the power company 1a to the facilities 3a, 3b of the properties A, B, through a power source line 102a. The equipment units 20 inside each property are supplied with power from the power source 6 via an indoor power source line 102b The power management apparatus 10 and the equipment management apparatuses 30 are connected through, e.g., the Internet 101a. The equipment management apparatus 30 and the equipment units 20 in each property are connected through a designated control line 101b The types of equipment units 20 are not limited to the air conditioners 20a, the lighting equipment 20b, or the ventilation fans 20c.

(3) Configurations of Apparatuses

The power management apparatus 10 and the equipment management apparatuses 30, which are included in the energy management system 100, are described below.

(3-1) Power Management Apparatus 10

Figure 5:
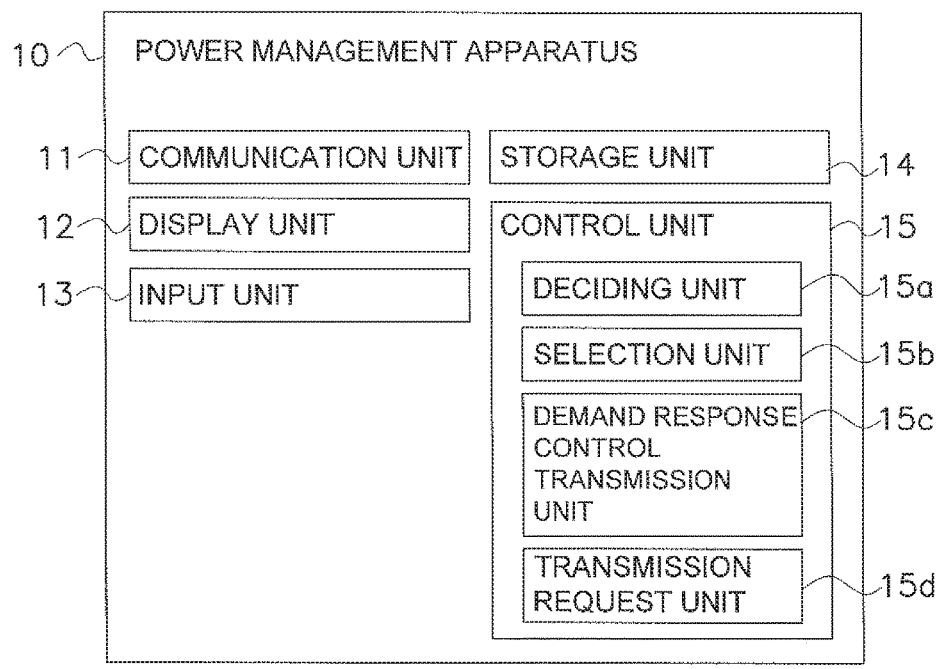
FIG. 5 is a block diagram showing an example of a power management apparatus.

FIG. 5 shows the schematic configuration of the power management apparatus 10. The power management apparatus 10 comprises a communication unit 11, a display unit 12, an input unit 13, a storage unit 14, and a control unit 15.

The communication unit 11 is a network interface through which the power management apparatus 10 can be connected to the internet 101a. The display unit 12 is configured including a display. The input unit 13 is configured including, e.g., operating buttons, a keyboard, and a mouse. The storage unit 14 is configured including a hard disk. For each property, the storage unit 14 stores a combination of the amount by which and time during which energy can be reduced, this combination being transmitted from the equipment management apparatus 30 of the property A or B. The control unit 15 is configured from a CPU, a ROM, and a RAM. By reading and executing programs stored in the storage unit 14 described above, the control unit 15 functions as a deciding unit 15a, a selection unit 15b, a demand response control transmission unit 15c, and a transmission request unit 15d, which are shown in FIG. 5.

The deciding unit 15*a* estimates the amount of power supply and the amount of demand, and when the deciding unit has judged that there is a possibility of the amount of demand exceeding the amount of supply after a predetermined time duration, the deciding unit makes a decision to request a suppression of the amount of energy consumed, such as the power and/or the amount of power, in the properties A, B. Accordingly, the deciding unit decides for how long and in what amount the power demand needs to be reduced for the entire energy management system 100. The selection unit 15*b* selects a time slot and an amount of power reduction with which demand response control will be executed for each property, on the basis of the information stored in the storage unit 14 and the time and reduction amount decided by the deciding unit 15*a*.

The demand response control transmission unit 15*c* causes the request to perform demand response control, and the time slot and the amount of power reduction with which demand response control will be executed as decided by the selection unit 15*b*, to be outputted from the communication unit 11 to the properties A, B.

The case described in this example is one in which the amount of power reduction is transmitted with tie request for demand response control, but if at least the request for demand response control and the time slot during which demand response control is implemented are communicated from the magnetic fluid 10 to the equipment management apparatus 30, the equipment management apparatus 30 can decide the baseline. In other words, information pertaining to the time slot in which demand response control is implemented is essential for the equipment management apparatus 30 to decide the baseline, but the amount of power reduction being sent from the power company 1*a* is not an essential requirement for the equipment management apparatus 30 to decide the baseline, and either the amount of power reduction for performing demand response control may be settled in each property A, B individually, or the amount of power reduction may be settled in advance by contract.

(3-2) Equipment Management Apparatus 30

Figure 6:
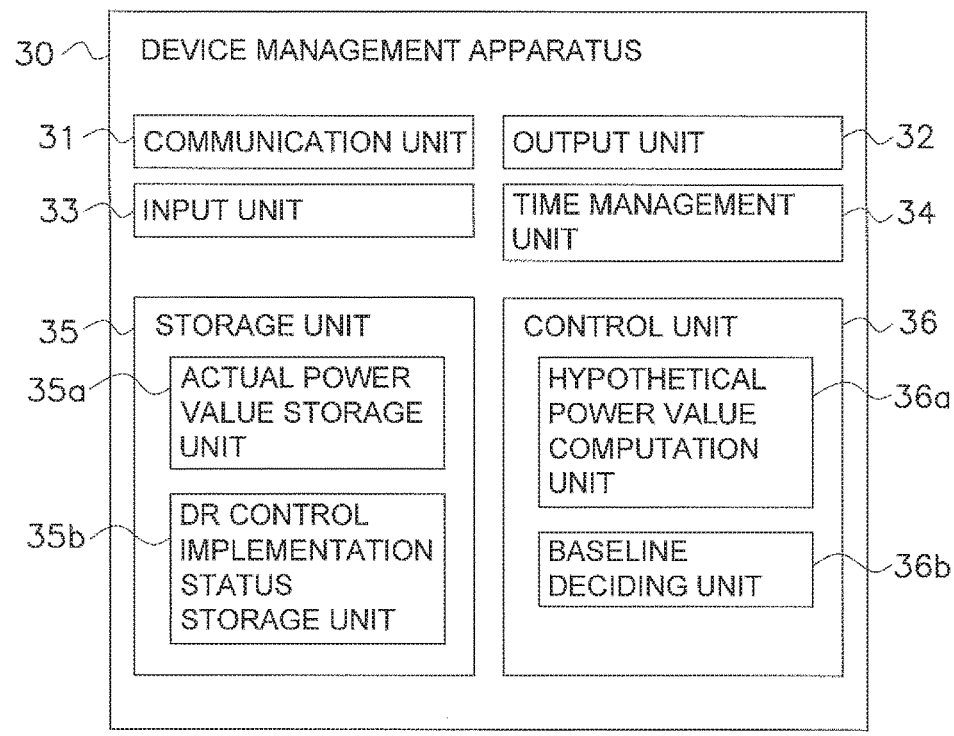
FIG. 6 is a block diagram showing a configuration of an equipment management apparatus according to one embodiment.

FIG. 6 shows a schematic configuration of an equipment management apparatus 30. The equipment management apparatus 30 installed in the property A is described below, but the equipment management apparatus 30 installed in the property B is configured in the same manner. Each equipment management apparatus 30 comprises a communication unit 31, an output unit 32, an input unit 33, a time management unit 34, a storage unit 35, and a control unit 36.

The communication unit 31 is a network interface through which the equipment management apparatus 30 can be connected to the internet 101*a*. Two-way communication between the equipment management apparatus 30 and the power management apparatus 10 is conducted by the communication unit 31 via the internet 101*a*. The output unit 32 is configured including, e.g., a display. Images representing the operating states of the equipment units 20 are displayed on the output unit 32. The information displayed in the images of the output unit 32 pertains to, e.g., whether the equipment units 20 are on or off, the operating modes (e.g., cooling mode/heating mode etc. for the air conditioners 20*a*), the set temperatures, illumination, quantity of ventilation, working time, working rate, and operating capability when running. The current power consumption and other parameters are also displayed.

The input unit 33 is configured including, e.g., operation buttons and a touch screen covering the display of the output unit 32. The input unit 33 can be used to input start/stop signals for the equipment units 20, setting changes, operation mode changes, and other various commands for the equipment units 20. The time management unit 34 has a clock that is substantially synchronized with the power management apparatus 10 of the power company 1*a*, and the time management unit performs time management on the various controls carried out by the equipment management apparatus 30.

(3-2-1) Storage Unit 35

The storage unit 35 is configured including a hard disk capable of storing information transmitted and received by, e.g., the communication unit 31, the output unit 32, and/or the input unit 33. Programs that can be read and executed by the control unit 36, described hereinafter, are stored in the storage unit 35. The storage unit 35 has a power consumption storage unit 35*a* and a DR (demand response) control implementation status storage unit 35*b*.

The power consumption storage unit 35*a* stores a power amount for each time slot of each equipment unit 20. In other words, the power consumption storage unit 35*a* receives data pertaining to the power consumption amounts in all time slots from the power meter 7, and stores the received data.

In this embodiment, the plurality of equipment units 20, i.e., the air conditioners 20*a*, the lighting equipment 20*b*, and the ventilation fans 20*c* are collectively managed by the equipment management apparatus 30, but the equipment management apparatus 30 can also be configured so as to manage the air conditioners 20*a*, the lighting equipment 20*b*, and the ventilation fans 20*c* individually. In the case of individual management, power meters 7 would be provided respectively to the individually managed air conditioners 20*a*, lighting equipment 20*b*, and ventilation fans 20*c* The configuration would preferably be such that time-slot-specific power consumption amount, for the air conditioners 20*a*, the lighting equipment 20*b*, and the ventilation fans 20*c*, are individually transmitted from the plurality of power meters 7 to the equipment management apparatus 30.

In this embodiment, the power consumption storage unit 35*a* stores a power consumption amount specific to each time slot, but if the power consumption amounts are split by time slot length, each power consumption amount will be the average power consumption of the respective time slot, which can therefore be regarded as storing the average power consumption of each time slot. Of course, the power consumption storage unit 35*a* may also be configured so as to receive and store the varying power consumption from the power meter 7.

The DR control implementation status storage unit 35*b* (an example of the adjustment control implementation status storage unit) stores data pertaining to the implementation status for specifying whether or not DR control has been implemented (an example of the adjustment control implementation status information), for each time slot stored in the power consumption storage unit 35*a*. This data pertaining to the implementation status may be, e.g., the time during which DR control has been implemented, or a flag indicating the implementation status, appended to each time slot. FIG. 7(*a*) shows whether or not DR control has been implemented in each time slot of a past particular day used to decide the baseline for the current day. If the data pertaining to the status of DR control implementation stored in the DR control implementation status storage unit 35*b* is used, the equipment management apparatus 30 can perceive the specifics shown in FIG. 7(*a*). This type of data pertaining to the implementation status of DR control can be created by the storage unit 35 recording the implementation status of DR control performed by the equipment management apparatus 30.

(3-2-2) Control Unit 36

The control unit 36 is configured from, e.g., a CPU, a ROM, and a RAM. By reading and executing programs stored in the storage unit 35 described above, the control unit 36 is able to exhibit the functions of a hypothetical power value computation unit 36a and a baseline deciding unit 36b, shown in FIG. 6.

The hypothetical power value computation unit 36a uses the data pertaining to the implementation status of DR control, stored in the DR control implementation status storage unit 35b, to calculate a complementary value for the amount of power used by an equipment unit 20, for a time slot in which DR control was implemented. The result value from 13:00 to 13:15 on one day prior is used as a past result value for deciding the baseline of the current day, as shown in FIG. 7(a). A complementary value, used for complementation in the time slot from 13:00 to 13:15 on one day prior, is calculated by the hypothetical power value computation unit 36a. The complementary value calculation performed by the hypothetical power value computation unit 36a will be described in detail hereinafter.

The baseline deciding unit 36b decides the baseline for the current day using the result value stored in the power consumption storage unit 35a and the complementary value calculated by the hypothetical power value computation unit 36a. A common prior-art calculation method can be used as the method for calculating the baseline. For example, an averaging method of calculating the baseline from an average value of data from multiple days within the same period of time in the past, a regression analysis method of estimating the load of the current day using many variables (past load patterns, the weather, the day of the week, etc.) that affect the load, an equivalent day employing method of finding a day that most resembles the current day from past data and employing this day as a baseline, and a weighted moving average method of calculating a baseline by increasing the weight of data close to the current day, are known from the prior art as methods for calculating baseline.

When deciding the baseline, the power consumption amount in the DR control time slot, complemented by the complementary value, is handled by the baseline deciding unit 36b in the same manner as the power consumption amount without DR control. Handling the power consumption amount in this manner makes it possible, when deciding baseline, to refer to data for 13:00 to 13:15 of one day prior without going as far back as four days prior; in the case shown in FIG. 7(a). If it is necessary to refer to two or more days, it is also possible to refer to the complementary value of two days prior and/or the complementary value of three days prior.

(4) Complementation by Hypothetical Power Value Computation Unit 36a

When the data referenced in order to calculate the baseline includes the effect of DR control, the hypothetical power value computation unit 36a complements the data including the effect of DR control with a value that does not include the effect of DR control. A specific example of the complementation method used by the hypothetical power value computation unit 36a is described below.

(4-1) Method of Specifying Complemented Object

The hypothetical power value computation unit 36a can specify the time slot in which DR control was implemented, using the data pertaining to the implementation status of DR control stored in the DR control implementation status storage unit 35b, but the complemented object is not limited to the time slot of DR control implementation, and the complemented object can be expanded to a longer time slot including the time slot of DR control implementation.

(4-1-1) Only the Time Slot of DR Control Implementation is Complemented

Figure 8:
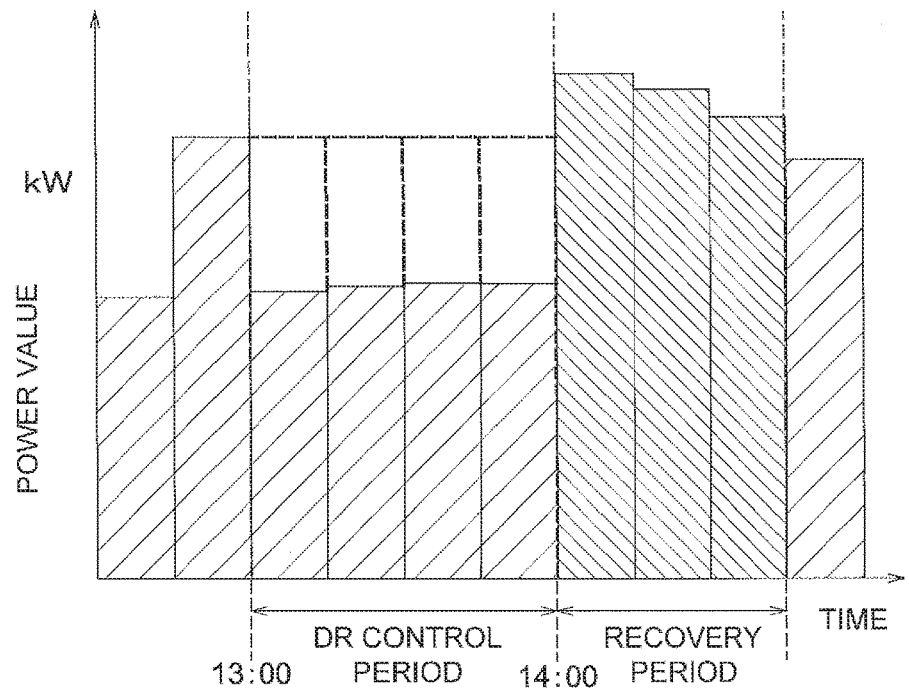
FIG. 8 is a graph for illustrating the relationship between result values and complementary values during the DR control time slot.

In the graph shown in FIG. 8, it is clear that DR control is performed only for sixty minutes, from 13:00 to 14:00 The complemented object in the case of FIG. 8 is only the time slot from 13:00 to 14:00, which is the time slot of DR control implementation.

Figure 9:
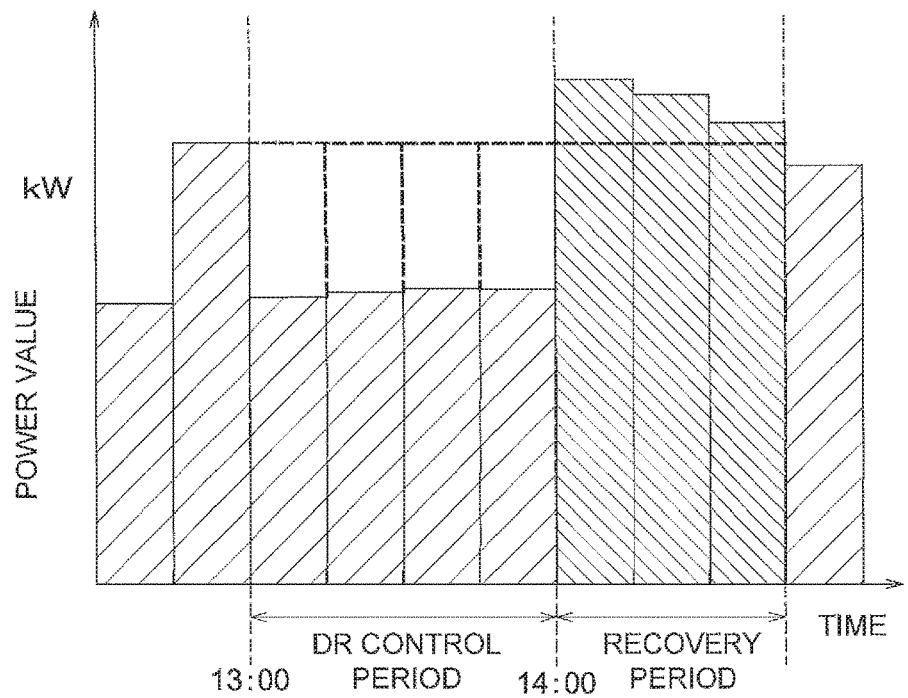
FIG. 9 is a graph for illustrating the relationship between result values and complementary values during the DR control time slot and the recovery period.

(4-1-2) Time Slot of DR Control Implementation and Recovery Period are Both Complemented In the graph shown in FIG. 9, it is clear that DR control is performed for 60 minutes, from 13:00 to 14:00. The complemented objects in the case of FIG. 9 are the time slot from 13:00 to 14:00 and the time slot from 14:00 to 14:45. This time slot from 14:00 to 14:45 is the recovery period. When the air conditioners 20a are included in the equipment units 20, the air conditioners 20a could be stopped from 13:00 to 14:00 by DR control, or the set temperature of the air conditioners 20a could be shifted to a value nearer to the ambient temperature. In such cases, when the DR period ends, the air conditioners 20a begin operating and the power consumption becomes comparatively large. In such cases of a power rebound, in which power consumption is greater than normal during the recovery period, a state without DR control can be further approached when the complemented object is extended into the recovery period.

The manner in which to set the recovery period could be, e.g., to set the recovery period as a fixed period following the end of DR control, or to set the recovery period as a period lasting until the room temperature returns to a comfortable temperature following the end of DR control. In the latter case, the comfortable temperature is, e.g., the temperature immediately before the start of DR control, the set temperature that has been set for the air conditioners 20a, or a specific set value, such as 28° C. if the cooling operation is in effect.

(4-2)

Complementary Value Calculation Method

Next, the complementary value calculation method performed by the hypothetical power value computation unit 36a shall be described in detail using FIGS. 8 and 9. The hypothetical power value computation unit 36a computes the complementary value using information pertaining to the result value of a particular day that includes the time slot complemented by the complementary value of the amount of power used by the equipment units 20. As was already described, the complemented object is the amount of power during not only the period in which DR control was implemented, but also during the period affected by DR control, which in this embodiment is the recovery period.

(4-2-1) Substituting with Value Preceding DR Control Time Slot

In this section there is described a complementary value calculation method in which the power consumption amount in the time slot of DR control implementation is substituted by a value preceding or following the time slot of DR control implementation. In both the case shown in FIG. 8 and the case shown in FIG. 9, the complementary value is calculated using the power consumption amount of the time slot preceding 13:00.

(4-2-1-1) Method of Substituting with One Value Preceding DR Control Period

When the power consumption amount for the time slot of DR control implementation is to be complemented, the power consumption amount of the time slot from 12:45 to 13:00, which immediately precedes the time slot of DR control implementation, is set as power consumption amount for the time slot from 13:00 to 13.15, the time slot from 13:15 to 13:30, the time slot from 13:30 to 13:45, and the time slot from 13:45 to 14:00, as shown in FIG. 8. When the recovery period is to be complemented, the aforementioned power consumption amount is also set as the power consumption amount for the time slot from 14:00 to 14:15, the time slot from 14:15 to 14:30, and the time slot from 14:30 to 14:45, as shown in FIG. 9.

(4-2-1-2) Method Using Plurality of Immediately Preceding Time Slots

With a method of calculating the complementary value from the power consumption amount for each of a plurality of immediately preceding time slots, the complementary value is determined by averaging, e.g., the power consumption amount for the time slot of 12:45 to 13:00, which immediately precedes the time slot of DR control implementation in FIG. 8. The number of time slots averaged is set as appropriate, and two time slots of fifteen-minute intervals each are used in this embodiment, but three or more time slots may be used. In the case described here, the length of the time slots is fifteen minutes, but the time slots may be another length other than fifteen minutes. The time slots may be shorter than fifteen minutes, such as, e.g., one minute or thirty seconds, or the time slots may be longer than fifteen minutes, such as, e.g., twenty or thirty minutes. Another possible calculation method for determining the complementary value, other than using the average value, is to have the complementary value be the minimum value of the power consumption amounts for a plurality of time slots immediately preceding the time slot of DR control implementation. Another possible calculation method for determining the complementary value, other than using the average value, is to have the complementary value be the maximum value of the power consumption amounts for a plurality of time slots immediately preceding the time slot of DR control implementation. The complemented object, complemented by the complementary value calculated in this manner, is the same as those of the cases described above.

(4-2-1-3) Method Using Specific Time Period Preceding DR Control Period

The power consumption amount of a predetermined specific time period, rather than that of an immediately preceding time slot, can also be used. In the case shown in FIG. 8, the power consumption amount X1 for, e.g., ten minutes from 12:50 to 13:00, which immediately precedes the time slot of DR control implementation, may be used. In other words, a value equal to 1.5 times the power consumption amount X1 (X1×1.5) is used as the respective power consumption amounts for the time slot from 13:00 to 13:15, the time slot from 13.15 to 13:30, the time slot from 13:30 to 13.45, and the time slot from 13.45 to 14:00.

The power consumption amount of the time period from, e.g., 11:00 to 12:00 can also be used. In special circumstances, such as when there is a decrease in the power consumption amount of the equipment units 20 at a time such as the lunch break time from 12:00 to 13:00, possibilities include setting the time period excluding the time slot during which the special circumstances occur. Thus, even when a specific time period is used, a method that uses, e.g., a minimum value, an average value, or a maximum value as the complementary value can be employed.

(4-2-2) Method of Substituting with a Value Following DR Control Time Slot

In a manner conceptually identical to substituting with a value prior to the time slot of DR control implementation described above, a following time slot that is unaffected by DR control implementation can also be used for substitution. With a time slot following DR control implementation, there are cases in which the effects of DR control implementation cannot be ignored, in a period such as the recovery period shown in FIG. 9. In such cases, the complementary value is calculated using the power consumption amount of the time slot following the recovery period. For example, in cases such as when the equipment units 20 include only the lighting equipment 20b, the fluctuation in the power consumption amount during the recovery period is considered small enough to be ignored. In such cases, the immediately following time slot can be used in the same manner as using the time slot preceding DR control implementation, without taking the recovery period into account.

When a value following the time slot of DR control implementation is used for substitution, it is possible to use a method similar to substitution with one value preceding the DR control period in (4-2-1-1), a method similar to the method of using a plurality immediately preceding time slots in (4-2-1-2), and a method similar to the method of using a specific time period preceding the DR control period in (4-2-1-3). It is also possible to employ a method of substitution with one value following the DR control period and/or the recovery period, a method of using a plurality of time slots following the DR control period and/or the recovery period, and a method of using a specific time period following the DR control period and/or the recovery period.

(4-2-3) Method of Substitution with Values Preceding and Following DR Control Time Slot With a method of calculating the complementary value from the power consumption amounts for a plurality of preceding and following time slots, the complementary value is determined by averaging, e.g., the power consumption amount for the time slot of 12:45 to 13:00, which immediately precedes the time slot of DR control implementation in FIG. 8, and the power consumption amount for the immediately following time slot of 14:45 to 15:00. The number of time slots averaged is set as appropriate, and three time slots of fifteen-minute intervals each are used in this embodiment, but, for example, the average may be taken from one preceding time slot and one following time slot, or the average may be taken from a combination of any desired number of preceding and following time slots. In the case described here, the length of the time slots is fifteen minutes, but the time slots may be another length other than fifteen minutes. Another possible calculation method for determining the complementary value, other than using the average value, is to have the complementary value be the minimum value of the power consumption amounts for a plurality of time slots preceding and following the time slot of DR control implementation. Another possible calculation method for determining the complementary value, other than using the average value, is to have the complementary value be the maximum value of the power consumption amounts for a plurality of time slots preceding and following the time slot of DR control implementation. The complemented object, complemented by the complementary value calculated in this manner, is the same as those of the cases described above. Whether the effect of the recovery period may or may not be taken into account is similar to the method of substitution with the following time slot unaffected by DR control implementation in (4-2-2) described above.

(4-2-4) Method of Substitution with Nearest Value Preceding or Following DR Control Time Slot In a method of substitution with the nearest value preceding or following the time slot of DR control implementation, whether the effect of the recovery period may or may not be taken into account is similar to the method of substitution with the following time slot unaffected by DR control implementation in (4-2-2) described above. In this example, FIG. 9 is used to describe a case of taking the effect of the recovery period into account.

When the single nearest value is used, the complementary value of, e.g., the time slot from 13:00 to 13:15, is substituted by the power consumption amount of the time slot from 12.45 to 13:00. Similarly, the complementary value of the time slot from 13:15 to 13:30 and the complementary value from 13.30 to 13:45 are also substituted by the power consumption amount of the time slot from 12:45 to 13:00.

On the other hand, the complementary value of the time slot from 14.30 to 14.45 is substituted by the power consumption amount of the time slot from 14:45 to 15:00. Similarly, the complementary value of the time slot from 14:15 to 13:30 and the complementary value from 14:00 to 14:15 are also substituted by the power consumption amount of the time slot from 14.45 to 15:00.

However, the time slot from 14:30 to 14:45 is equally close to the time slot from 12:45 to 13:00 and the time slot from 14:45 to 15:00. In such cases, which preceding or following time slot to take the power consumption amount from is preferably decided in advance.

Even when using the power consumptions of a plurality of immediately preceding and immediately following time slots, the complementary value can be computed analogously with respect to the concept described earlier similar. In this case, for example, the average value, minimum value, or maximum value is determined in a plurality of time slots preceding DR control implementation, and the determined value is used for the complementary value of the time slot of the first half of DR control implementation. In addition, for example, the average value, minimum value, or maximum value is determined in a plurality of time slots following DR control implementation, and the determined value is used for the complementary value of the time slot of the second half of DR control implementation.

When the power consumptions of the immediately preceding and immediately following specific time periods are used, the complementary value can be computed similar to the manner of thinking previously described. In this case, for example, the average value, minimum value, or maximum value is determined in a specific time slot preceding DR control implementation, and the determined value is used for the complementary value of the time slot of the first half of DR control implementation. In addition, for example, the average value, minimum value, or maximum value is determined in a specific time period following the time slot affected by DR control implementation, and the determined value is used for the complementary value of the time slot of the second half of DR control implementation.

(4-2-5) Regression Analysis from Operating Conditions

A regression formula, used to project power consumption from operating conditions or environmental conditions, is prepared in advance from past operating conditions of the equipment units 20. The prepared regression formula is stored in the storage unit 35 of the equipment management apparatus 30. The hypothetical power value computation unit 36a of the control unit 36 substitutes the operating conditions or environmental conditions of the current day into the regression formula read from the storage unit 35, and calculates the power consumption of the equipment units 20 for the time slot in which DR control is implemented. The hypothetical power value computation unit 36a uses the calculated power consumption to compute a complementary value for the time slot affected by DR control implementation. The input parameters used in the regression formula are, e.g., the set temperature, the outside air temperature, and the number of operating indoor units of the air conditioners 20a.

(4-2-6) Employing Power Consumption Amount of Equivalent Day

The past operating information of the equipment units 20 is organized and stored in the storage unit 35 in advance. Using the past operating information of the equipment units stored in the storage unit 35, the hypothetical power value computation unit 36a extracts, as a complementary value, the power consumption amount during operating conditions or environmental conditions equivalent to those of the particular day for which the complementary value is to be computed. In this case, when past operating conditions or environmental conditions coinciding with the particular day for which the computation is done are not found in the operating information stored in the storage unit 35, the power consumption amount during the most recent past operating conditions or environmental conditions is extracted as a complementary value. The input parameters used in this extraction are, e.g., the set temperature, the outside air temperature, the operating time duration, and the number of operating indoor units of the air conditioners 20a.

(5) Characteristics (5-1)

As described above, the equipment management apparatus 30 according to an embodiment of the present invention receives a power supply and manages equipment units 20 that are consuming power. For the equipment management apparatus 30 described above, the description dealt with electricity as the energy, but the energy dealt with may be something other than electricity. e.g., gas.

With the equipment management apparatus 30, a complementary value (an example of the hypothetical value) of the power consumption amount (an example of the amount of energy consumed) of the equipment units 20, e.g., the power consumption amount of the time slot from 13:00 to 13.15 on one day prior (an example of the first particular day) shown in FIG. 7(a) is affected by DR control as shown in FIGS. 8 and 9, and is therefore complemented by, e.g., the power consumption amount of the time slot from 12:45 to 13:00 on one day prior. Thus, because the complementary value of one day prior is replaced by the result value of one day prior (an example of computation in which information pertaining to the result value of the first particular day is used), the situation of one day prior, which is the same day, is more easily reflected in the complementary value of 13:00 to 13:15 of one day prior, than in a case of using a result value of another past day besides one day prior. As a result, when the baseline is projected using this type of complementary value, highly reliable baseline can be provided.

(5-2)

The baseline deciding unit 36b (an example of the baseline deciding unit) uses the result value of the equipment units 20 stored in the power consumption storage unit 35a (an example of the result value storage unit) and the complementary value of the equipment units 20 computed by the hypothetical power value computation unit 36a to decide the baseline (an example of the baseline) for the current day (an example of the second particular day) when demand response control (an example of energy adjustment control)

had not been performed. Thus, it is possible to decide a highly reliable baseline because the baseline is decided by the baseline deciding unit 36*b* using a highly reliable complementary value (an example of the hypothetical value) computed by the hypothetical power value computation unit 36*a*.

Figure 10:
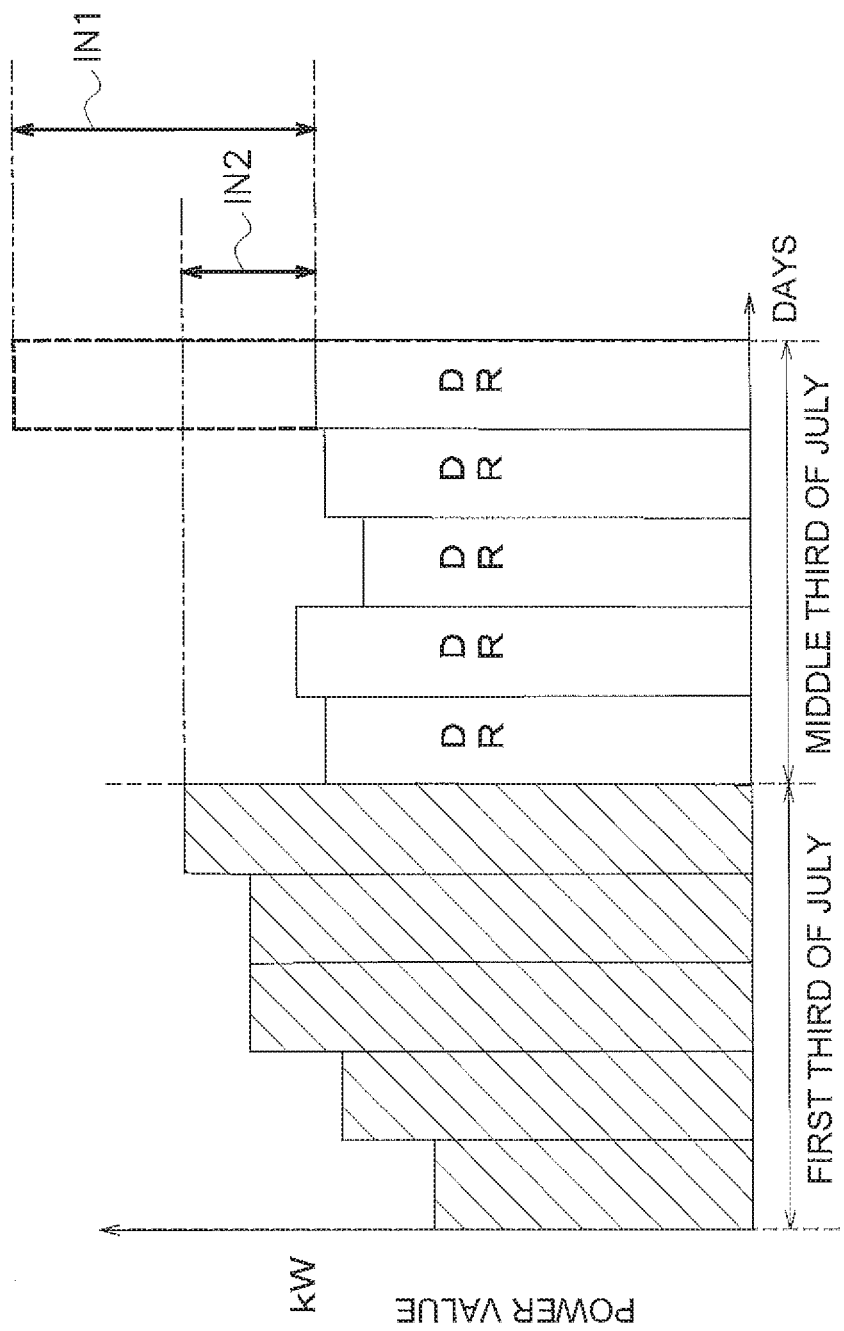
FIG. 10 is a conceptual diagram for illustrating a problem with a conventional baseline calculation method.

For example, with a prior-art baseline calculation method such as that shown in FIG. 7(*b*), the result value for 13:00 to 13:15 on four days prior, which was unaffected by DR control, needs to be referenced in order to calculate the baseline of the time slot from 13:00 to 13:15 of the current day. With this type of prior-art baseline calculation method, when the middle third of July has continuous days of DR control, the referenced data could go as far back as the data of 13:00 to 13:15 of the past days in the first third of July, as shown in FIG. 10. In this case, with an equipment unit 20 affected by the seasons, such as the air conditioners 20*a*, only an incentive IN2 is actually received instead of an incentive IN1 that originally should have been received, and there is inevitably a large difference (IN1–IN2) in the incentives.

With the present invention, however, it is possible to decide a highly reliable baseline because the power consumption of 13:00 to 13:15 of one day prior is replaced by a complementary value unaffected by DR control, as shown in FIG. 7(*a*), and the complementary value of one day prior is used by the baseline deciding unit 36*b* to decide the baseline.

(5-3)

Assuming that the data shown in FIG. 8 is the one-day-prior data that should be referenced in FIG. 7(*a*), the baseline deciding unit 36*b* would use a hypothetical value of the equipment units 20 for the power consumption amount of the time slot from 13:00 to 14:00 during which DR control was performed, and would use the result value of the equipment units 20 for the power consumption amount of the time slot from 14:00 to 14:45 during which DR control was not performed, in order to decide the baseline of the current day (an example of the second particular day). For example, if the equipment units 20 are only lighting equipment 20*b*, there are almost no power rebounds or other fluctuations during the recovery period in FIG. 8, and errors can therefore be reduced when the result value is applied in this manner to a case of the power consumption amount being unlikely affected by DR control. As a result, the reliability of the baseline can be improved.

(5-4)

Assuming that the data shown in FIG. 9 is the one-day-prior data that should be referenced in FIG. 7(*a*), the baseline deciding unit 36*b* would use a complementary value of the equipment units 20 for the power consumption amount of the time slot from 13:00 to 14:00 during which DR control was performed, and would use a complementary value also for the power consumption amount of the time slot from 14:00 to 14:45 in the recovery period during which DR control was not performed, in order to decide the baseline of the current day (an example of the second particular day). For example, if the equipment units 20 are greatly affected by the air conditioners 20*a*, the power rebounds or other fluctuations are large during the recovery period in FIG. 9, and errors can therefore be reduced when the result value is applied to a case of the power consumption amount being affected by DR control and fluctuating in the recovery period. As a result, the reliability of the baseline can be improved.

(5-5)

To calculate a complementary value using information pertaining to the result value of the same day (an example of the first particular day), the hypothetical power value computation unit 36*a* may perform complementation using, e.g., a result value of a time slot up to 13:00 prior to the time slot of 13:00 to 14:00 during which DR control was performed, as was described using FIGS. 8 and 9. Due to this manner of complementation with a result value of the same day prior to DR control being performed, it is possible for the complementary value of the same day to be computed in a short time after DR control by a simple process of complementation performed by the hypothetical power value computation unit 36*a*. As a result, a complementary value unaffected by DR control can be obtained in a simple manner without referring back to a past day.

(5-6)

To calculate a complementary value using information pertaining to the result value of the same day (an example of the first particular day), the hypothetical power value computation unit 36*a* may perform complementation using, e.g., a result value of a time slot from 14:00 onward following the time slot of 13:00 to 14:00 during which DR control was performed, as was described using FIGS. 8 and 9. Due to this manner of complementation with a result value of the same day after DR control is performed, it is possible for the complementary value of the same day to be computed in a short time after DR control by a simple process of complementation performed by the hypothetical power value computation unit 36*a*. As a result, a complementary value unaffected by DR control can be obtained in a simple manner without referring back to a past day.

(5-7)

The hypothetical power value computation unit 36*a* may input a parameter (an example of information pertaining to the result value) of a day containing the time slot to be complemented (an example of the first particular day) into a regression formula to calculate a complementary value, as was described using FIGS. 8 and 9. If a regression formula is used in this manner, the operating conditions, environmental conditions, and other factors for the equipment units 20 on the day containing the time slot to be complemented are reflected in the complementary value by the parameter, and errors in the complementary value computation caused by changing operating conditions or environmental conditions can be reduced. As a result, the reliability of the complementary value is improved.

(5-8)

The hypothetical power value computation unit 36*a* may input a parameter (an example of information pertaining to the result value) of a day containing the time slot to be complemented (an example of the first particular day) to perform an extraction in which the complementary value is a past result value having a parameter similar to the parameter of the same day, as was described using FIGS. 8 and 9. The operating conditions, environmental conditions, and other factors for the equipment units 20 on the day containing the time slot to be complemented are reflected in the complementary value by the parameter, and in cases such as when, e.g., peculiar circumstances arise in the power consumption amount of the equipment units 20 on that day, computational errors can be reduced by using a past result value of a different day as the complementary value. As a result, the number of errors in the computation of the complementary value can be reduced, and the reliability of the complementary value can be improved.

(6) Modifications
(6-1) Modification 1A

In the above embodiment, an equipment management apparatus 30 that receives DR control requests from a power company 1a was described, but the equipment management apparatus 30 according to the present invention can also be applied to a case in which DR control requests and/or information pertaining to energy prices are received from the energy transmission/distribution operator 2 and/or the aggregator 4.

(6-2) Modification 1B

In the above embodiment, a case was described in which the equipment units 20 include a plurality of various equipment units; namely, the air conditioners 20a, the lighting equipment 20b, and the ventilation fans 20c, but one equipment unit is also possible, and another possibility is for there to be a plurality of one type of device.

(6-3) Modification 1C

In the above embodiment, regressive analysis for finding a complementary value, or extraction of a past result value having a similar parameter, need not be performed solely on the same item; different items of the same type may be used.

What is claimed is:

1. An equipment management apparatus configured to manage at least one equipment unit that is supplied with energy and that consumes energy, the equipment management apparatus comprising:
   a memory including a result value storage unit configured to store result values of an amount of energy consumed in a first particular day by the at least one equipment unit, the result values being stored in association with time slots of the first particular day;
   the memory including an adjustment control implementation status storage unit configured to store adjustment control implementation status information indicating whether or not energy adjustment control, which is based on information pertaining to at least one of a request of the energy adjustment control and information pertaining to energy prices for the at least one equipment unit, has been performed in each of the time slots of the first particular day; and
   a computer including a hypothetical value computation unit configured to compute a hypothetical value of an amount of energy consumed by the at least one equipment unit based on the energy adjustment control having not been performed, the hypothetical value computation unit using information pertaining to the result values of the first particular day, for either
      a time slot during which the energy adjustment control as specified by the adjustment control implementation status information stored in the adjustment control implementation status storage unit has been performed, or
      an adjustment control effect period determined from the time slot, during which period consideration should be given to the effect of the energy adjustment control.

2. The equipment management apparatus according to claim 1, further comprising:
   a baseline deciding unit configured to decide a baseline of a second particular day based on the energy adjustment control having not been performed, the baseline deciding unit using the result values of the at least one equipment unit stored in the result value storage unit and the hypothetical value of the at least one equipment unit computed by the hypothetical value computation unit.

3. The equipment management apparatus according to claim 2, wherein
   the at least one equipment unit includes a first equipment unit, and
   in order to decide the baseline of the second particular day, the baseline deciding unit uses data of the first particular day including a hypothetical value of the first equipment unit for a time slot in which energy adjustment control was performed and a result value of the first equipment unit was used for a time slot in which the energy adjustment control was not performed.

4. The equipment management apparatus according to claim 2, wherein
   the at least one equipment unit includes a second equipment unit, and
   in order to decide the baseline of the second particular day, the baseline deciding unit uses a hypothetical value of the second equipment unit for a time slot in which the energy adjustment control was performed and also a time slot of a recovery period continuing from the time slot, and uses data of the first particular day for which the result value of the second equipment unit was used for a time slot in which the energy adjustment control was not performed, excluding the recovery period.

5. The equipment management apparatus according to claim 1, wherein
   the hypothetical value computation unit is further configured to perform, as a hypothetical value computation using information pertaining to the result values of the first particular day, complementation using the result value of a time slot preceding a time slot during which the energy adjustment control was performed.

6. The equipment management apparatus according to claim 1, wherein
   the hypothetical value computation unit is further configured to perform, as a hypothetical value computation using information pertaining to the result values of the first particular day; complementation using the result value of a time slot following a time slot during which the energy adjustment control was performed.

7. The equipment management apparatus according to claim 1, wherein
   the hypothetical value computation unit is further configured to compute the hypothetical value by inputting a parameter of the first particular day into a regression formula prepared in advance.

8. The equipment management apparatus according to claim 1, wherein
   the hypothetical value computation unit is further configured to perform, as a hypothetical value computation using information pertaining to the result values of the first particular day, an extraction in which a parameter of the first particular day is inputted and a past result value is extracted as the hypothetical value.

9. The equipment management apparatus according to claim 3, wherein
   the at least one equipment unit includes a second equipment unit, and
   in order to decide the baseline of the second particular day, the baseline deciding unit further uses a hypothetical value of the second equipment unit for a time slot in which the energy adjustment control was performed and also a time slot of a recovery period continuing from the time slot, and further uses data of the first particular day for which the result value of the second equipment unit was used for a time slot in which the energy adjustment control was not performed, excluding the recovery period.

10. The equipment management apparatus according to claim 2, wherein
the hypothetical value computation unit is further configured to perform, as a hypothetical value computation using information pertaining to the result values of the first particular day; complementation using the result value of a time slot preceding a time slot during which the energy adjustment control was performed.

11. The equipment management apparatus according to claim 2, wherein
the hypothetical value computation unit is further configured to perform, as a hypothetical value computation using information pertaining to the result values of the first particular day, complementation using the result value of a time slot following a time slot during which the energy adjustment control was performed.

12. The equipment management apparatus according to claim 2, wherein
the hypothetical value computation unit is further configured to compute the hypothetical value by inputting a parameter of the first particular day into a regression formula prepared in advance.

13. The equipment management apparatus according to claim 2, wherein
the hypothetical value computation unit is further configured to perform, as a hypothetical value computation using information pertaining to the result values of the first particular day, an extraction in which a parameter of the first particular day is inputted and a past result value is extracted as the hypothetical value.

14. The equipment management apparatus according to claim 5, wherein
the hypothetical value computation unit is further configured to perform, as a hypothetical value computation using information pertaining to the result values of the first particular day, complementation using the result value of a time slot following a time slot during which the energy adjustment control was performed.

15. The equipment management apparatus according to claim 5, wherein
the hypothetical value computation unit is further configured to compute the hypothetical value by inputting a parameter of the first particular day into a regression formula prepared in advance.

16. The equipment management apparatus according to claim 5, wherein
the hypothetical value computation unit is further configured to perform, as a hypothetical value computation using information pertaining to the result values of the first particular day, an extraction in which a parameter of the first particular day is inputted and a past result value is extracted as the hypothetical value.

17. The equipment management apparatus according to claim 6, wherein
the hypothetical value computation unit is further configured to compute the hypothetical value by inputting a parameter of the first particular day into a regression formula prepared in advance.

18. The equipment management apparatus according to claim 6, wherein
the hypothetical value computation unit is further configured to perform, as a hypothetical value computation using information pertaining to the result values of the first particular day, an extraction in which a parameter of the first particular day is inputted and a past result value is extracted as the hypothetical value.

19. The equipment management apparatus according to claim 7, wherein
the hypothetical value computation unit is further configured to perform, as a hypothetical value computation using information pertaining to the result values of the first particular day, an extraction in which a parameter of the first particular day is inputted and a past result value is extracted as the hypothetical value.

* * * * *